(12) United States Patent
Lefevre et al.

(10) Patent No.: US 8,781,295 B2
(45) Date of Patent: Jul. 15, 2014

(54) METHOD AND APPARATUS FOR ENABLING SUB-CHANNEL RECORDING AND PLAYBACK

(75) Inventors: Chad Andrew Lefevre, Indianapolis, IN (US); Bret David Hawkins Hawkins, Browsburg, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1249 days.

(21) Appl. No.: 10/554,766

(22) PCT Filed: May 4, 2004

(86) PCT No.: PCT/US2004/013862
§ 371 (c)(1),
(2), (4) Date: Oct. 31, 2005

(87) PCT Pub. No.: WO2004/100163
PCT Pub. Date: Nov. 18, 2004

(65) Prior Publication Data
US 2006/0215989 A1    Sep. 28, 2006

Related U.S. Application Data

(60) Provisional application No. 60/467,950, filed on May 5, 2003, provisional application No. 60/488,825, filed on Jul. 21, 2003.

(51) Int. Cl.
*H04N 9/80* (2006.01)
*H04N 5/935* (2006.01)
*H04N 5/765* (2006.01)
*H04N 5/76* (2006.01)

(52) U.S. Cl.
USPC ............ 386/239; 386/213; 386/231; 386/291

(58) Field of Classification Search
USPC .................... 386/83, 95, 108, 125, 291–299, 386/200–234, 239–248
See application file for complete search history.

(56) References Cited

U.S. PATENT DOCUMENTS 5,619,337 A * 4/1997 Naimpally ...................... 386/83
5,751,700 A   5/1998 Imaeda
(Continued)

FOREIGN PATENT DOCUMENTS

EP  1 162 839 A2  12/2001
JP  8-97929        4/1996
(Continued)

OTHER PUBLICATIONS

Steinberg et al., "An Emperical Analysis of the IEEE-1394 Serial Bus Protocol", 2000, IEEE, p. 58-65.*

(Continued)

*Primary Examiner* — Hung Dang
(74) *Attorney, Agent, or Firm* — Robert D. Shedd; Reitseng Lin (57) ABSTRACT

An apparatus such as a television signal receiver controls a digital recording device via a digital data bus to enable sub-channel recording and playback. According to an exemplary embodiment, the apparatus includes a processor that is operative to process signals representing a plurality of sub-channels to generate digital data for a first one of the sub-channels. The digital data includes program data and identification data for the first sub-channel. An input/output terminal is operative to provide the digital data to a digital recording device via a digital data bus.

21 Claims, 3 Drawing Sheets

(56) References Cited

U.S. PATENT DOCUMENTS

| | | | |
|---|---|---|---|
| 5,909,257 A * | 6/1999 | Ohishi et al. | 348/726 |
| 5,999,691 A * | 12/1999 | Takagi et al. | 386/337 |
| 6,247,069 B1 * | 6/2001 | Smyers | 710/8 |
| 6,249,320 B1 | 6/2001 | Schneidewend et al. | |
| 7,206,031 B2 | 4/2007 | Yamamoto et al. | |
| 2001/0055465 A1 * | 12/2001 | Inoue | 386/46 |
| 2002/0174430 A1 * | 11/2002 | Ellis et al. | 725/46 |
| 2004/0047590 A1 | 3/2004 | Matsuo | |
| 2004/0109672 A1 | 6/2004 | Kim et al. | |
| 2004/0190515 A1 * | 9/2004 | Nogima et al. | 370/392 |

FOREIGN PATENT DOCUMENTS

| | | | | |
|---|---|---|---|---|
| JP | 9-46631 | 2/1997 | | |
| JP | 9-261549 | 10/1997 | | |
| JP | 10-243348 | 9/1998 | | |
| JP | 2000-32382 | 1/2000 | | |
| JP | 2000-165361 | 6/2000 | | |
| JP | 2001-359004 | 12/2001 | | |
| JP | 2002-290905 | 10/2002 | | |
| JP | 2002-344832 A | 11/2002 | | |
| JP | 2002-344838 | 11/2002 | | |
| JP | 2003-111038 | 4/2003 | | |
| WO | WO 01/33837 A1 * | 5/2001 | | H04N 5/44 |
| WO | WO 03/005362 A1 * | 1/2003 | | G11B 20/10 |

OTHER PUBLICATIONS

Int'l Search Report, International Application No. PCT/US2004/013862.

Patent Abstracts of Japan vol. 2003 No. 03 May 5, 2003 & JP 2002 344838 a Funai Electric Co. Ltd. Nov. 29, 2002.

* cited by examiner

METHOD AND APPARATUS FOR ENABLING SUB-CHANNEL RECORDING AND PLAYBACK

CROSS REFERENCE TO RELATED APPLICATIONS

This application claims the benefit, under 35 U.S.C. §365 of International Application PCT/US04/13862, filed May 4, 2004, which was published in accordance with PCT Article 21(2) on Nov. 18, 2004 in English and which claims the benefit of U.S. provisional patent application No. 60/467,950 filed May 5, 2003 and U.S. provisional patent application No. 60/488,825 filed Jul. 21, 2003.

BACKGROUND OF THE INVENTION

1. Field of the Invention

The present invention generally relates to techniques for controlling a digital recording device, and more particularly, to a method and apparatus for controlling a digital recording device via a digital data bus to enable sub-channel recording and playback.

2. Background Information

A digital data bus can be utilized for transmitting digital data in a network among digital devices, such as television signal receivers, personal computers (PCs), display devices, video cassette recorders (VCRs), digital versatile disk (DVD) players, direct broadcast satellite (DBS) receivers, home control devices (e.g., security systems, temperature control devices, etc.), and/or other devices. A digital data bus is typically compliant with a particular standard or specification. An example of a wired digital bus standard includes the Institute for Electrical and Electronic Engineers (IEEE) 1394 High Performance Serial Bus standard, which is well known in the art. Wireless digital bus-standards, such as Hiperlan2, are also known in the art.

When recording digital data to a digital recording device such as an audio/video hard disk drive (AVHDD), digital video cassette recorder (DVCR), or other digital recording device via a wired (e.g., IEEE-1394, Ethernet, etc.) and/or wireless (e.g., Hiperlan2, Wi-Fi, etc.) digital bus, some content may be of too high a bandwidth for the digital recording device to properly record all of the digital data. For example, certain digital data streams such as 256-Quadrature Amplitude Modulated (QAM) digital cable streams may include too much data for certain digital recording devices to properly record the entire digital data stream. In other words, the digital recording device may become essentially flooded with data, and therefore unable to properly record the entire digital data stream.

Accordingly, there is a need for a method and apparatus, which avoids the foregoing problem, and is thereby capable of reducing the amount of data provided to a digital recording device. The present invention addresses these and/or other issues.

SUMMARY OF THE INVENTION

In accordance with an aspect of the present invention, a method for enabling digital recording is disclosed. According to an exemplary embodiment, the method comprises steps of receiving signals representing a plurality of sub-channels, processing the received signals to generate digital data for a first one of the sub-channels wherein the digital data includes program data and identification data for the first sub-channel, and providing the digital data to a digital recording device via a data bus.

In accordance with another aspect of the present invention, an apparatus is disclosed. According to an exemplary embodiment, the apparatus comprises processing means for processing signals representing a plurality of sub-channels to generate digital data for a first one of the sub-channels. The digital data includes program data and identification data for the first sub-channel. Input/output means provide the digital data to a digital recording device via a data bus.

In accordance with still another aspect of the present invention, a television signal receiver is disclosed. According to an exemplary embodiment, the television signal receiver comprises a processor that is operative to process signals representing a plurality of sub-channels to generate digital data for a first one of the sub-channels. The digital data includes program data and identification data for the first sub-channel. An input/output terminal is operative to provide the digital data to a digital recording device via a data bus.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
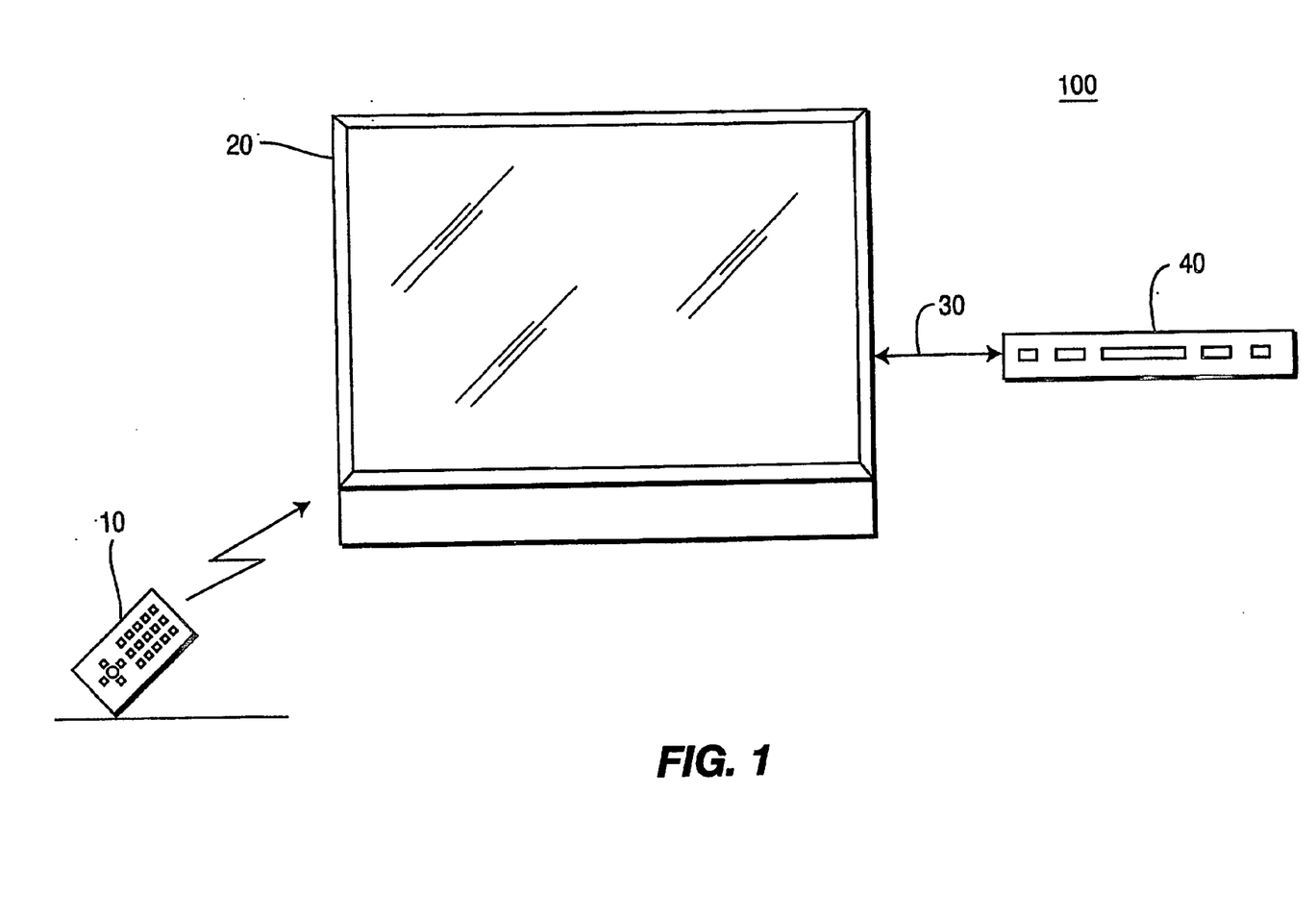
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, controlling means such as apparatus 20, digital bus means such as digital data bus 30, and digital recording means such as digital recording device 40.

User input device 10 is operative to receive user inputs that control the operation of apparatus 20 and/or digital recording device 40. According to an exemplary embodiment, user input device 10 comprises a plurality of keys and transmits command signals such as wireless infrared (IR) and/or radio frequency (RF) signals to apparatus 20 responsive to user depression of its keys. User input device 10 may for example be embodied as a hand-held remote control device, wired and/or wireless keyboard, or other user input device.

Apparatus 20 is operative to receive signals including audio, video and/or data signals in analog and/or digital format represented as channels from one or more signal sources such as terrestrial, cable, satellite, internet and/or other signal sources. As will be described later herein, each channel may include a plurality of sub-channels. Apparatus 20 is also operative to process these received signals and provide processed signals, as well as command signals, to one or more devices including digital recording device 40 via digital data bus 30. Apparatus 20 may also receive signals from one or more devices including digital recording device 40 via digital data bus 30. According to an exemplary embodiment, apparatus 20 controls digital recording device 40 via digital data bus 30 to enable sub-channel recording and playback. Further details regarding these aspects of apparatus 20 will be provided later herein.

Digital data bus 30 is operative to transmit digital signals between devices including apparatus 20 and digital recording device 40. According to an exemplary embodiment, digital data bus 30 may be embodied as a wired and/or wireless digital bus that is compliant with a given bus standard or specification. For example, digital data bus 30 may be embodied as a wired digital bus such as an IEEE-1394 bus and/or a wireless digital bus such as a Hiperlan2 bus.

Digital recording device 40 is operative to digitally record data including audio, video and/or other data provided from apparatus 20 via digital data bus 30. The digital data recorded by digital recording device 40 may also be provided to apparatus 20 via digital data bus 30 for output during playback. According to an exemplary embodiment, digital recording device 40 may be embodied as any type of digital recording device such as an AVHDD, DVCR, or other digital recording device that is compliant with the bus standard (e.g., IEEE-1394, Hiperlan2, etc.) of digital data bus 30.

Figure 2:
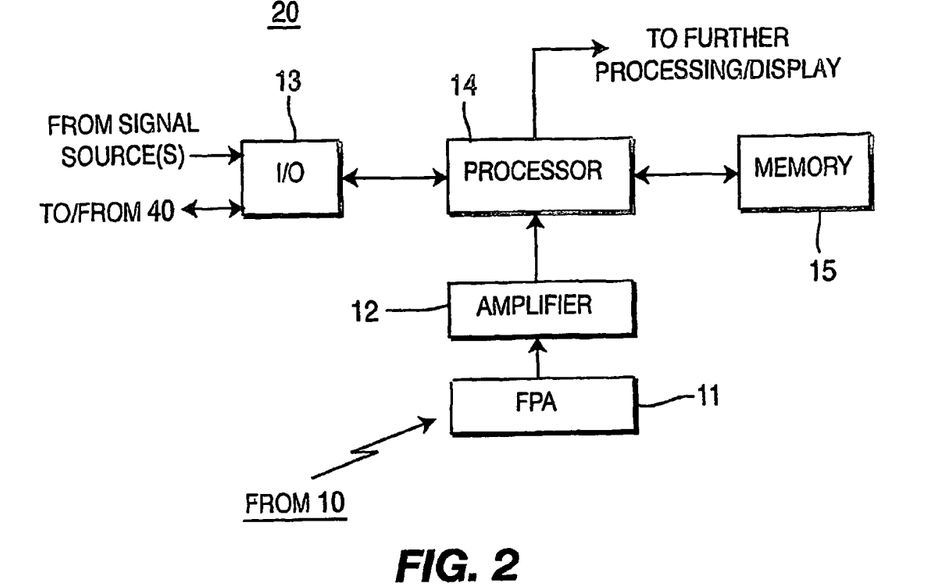
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 11, amplifying means such as amplifier 12, and input/output (I/O) means such as I/O block 13, processing means such as processor 14, and memory means such as memory 15. Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 11 is operative to receive user inputs from user input device 10, and to output signals corresponding to the user inputs to amplifier 12. According to an exemplary embodiment, FPA 11 receives signals, such as IR and/or RF signals, from user input device 10 and generates corresponding signals, which are output to amplifier 12. Amplifier 12 is operative to amplify the signals provided from FPA 11 for output to processor 14.

I/O block 13 is operative to perform I/O functions of apparatus 20. According to an exemplary embodiment, I/O block 13 is operative to receive signals such as audio, video and/or data signals in analog and/or digital format represented as channels from one or more signal sources such as terrestrial, cable, satellite, internet and/or other signal sources. As previously indicated herein, each channel may include a plurality of sub-channels. I/O block 13 is also operative to output processed signals, as well as command signals, to one or more other devices including digital recording device 40, and to receive signals from one or more devices including digital recording device 40. According to an exemplary embodiment, I/O block 13 includes a plurality of input and/or output terminals including at least one bi-directional terminal such as the one connected to digital data bus 30.

Processor 14 is operative to perform various signal processing and control functions of apparatus 20. According to an exemplary embodiment, processor 14 processes the signals provided from I/O block 13 by performing functions including tuning, demodulation, forward error correction, and transport processing functions to thereby generate digital data representing one or more sub-channels. The digital data produced from such processing functions may be provided for further processing (e.g., MPEG decoding, etc.) and display, and/or may be provided to one or more other devices including digital recording device 40 via digital data bus 30. The digital data generated by processor 14 may be in the form of packetized streams, which are known in the art. Accordingly, the terms "data packet" and/or "digital data stream" may be used herein to refer to such digital data.

Processor 14 is also operative to receive and process signals such as command signals provided via user input device 10, and such command signals may be used to control apparatus 20 and/or digital recording device 40. According to an exemplary embodiment, processor 14 may generate command signals such as audio video/control (AV/C) protocol signals as defined by the 1394 Trade Association, Grapevine, Tex., USA, or signals of another protocol, responsive to signals generated from user input device 10. The command signals generated by processor 14 may be used to control devices connected to digital data bus 30 such as digital recording device 40.

Processor 14 also performs a packet identifier (PID) filtering process which filters out all of the data packets in a received channel, except for those data packets having the desired PIDs corresponding to program guide data and one or more sub-channels selected by a user for recording. The PID filtering process may be used to reduce the amount of data provided to digital recording device 40 thereby reducing its bandwidth requirements. Further details regarding this aspect of the present invention will be provided later herein. Processor 14 may also perform various other functions such as, but not limited to, reading data from and writing data to memory 15, enabling menu displays, signal format detection, and/or other functions as described herein.

Memory 15 is operative to perform data storage functions of apparatus 20. According to an exemplary embodiment, memory 15 stores data such as software code, current operating mode data, user setup data, menu data and/or other data, which enables processor 14 to perform various functions as, described herein.

Figure 3:
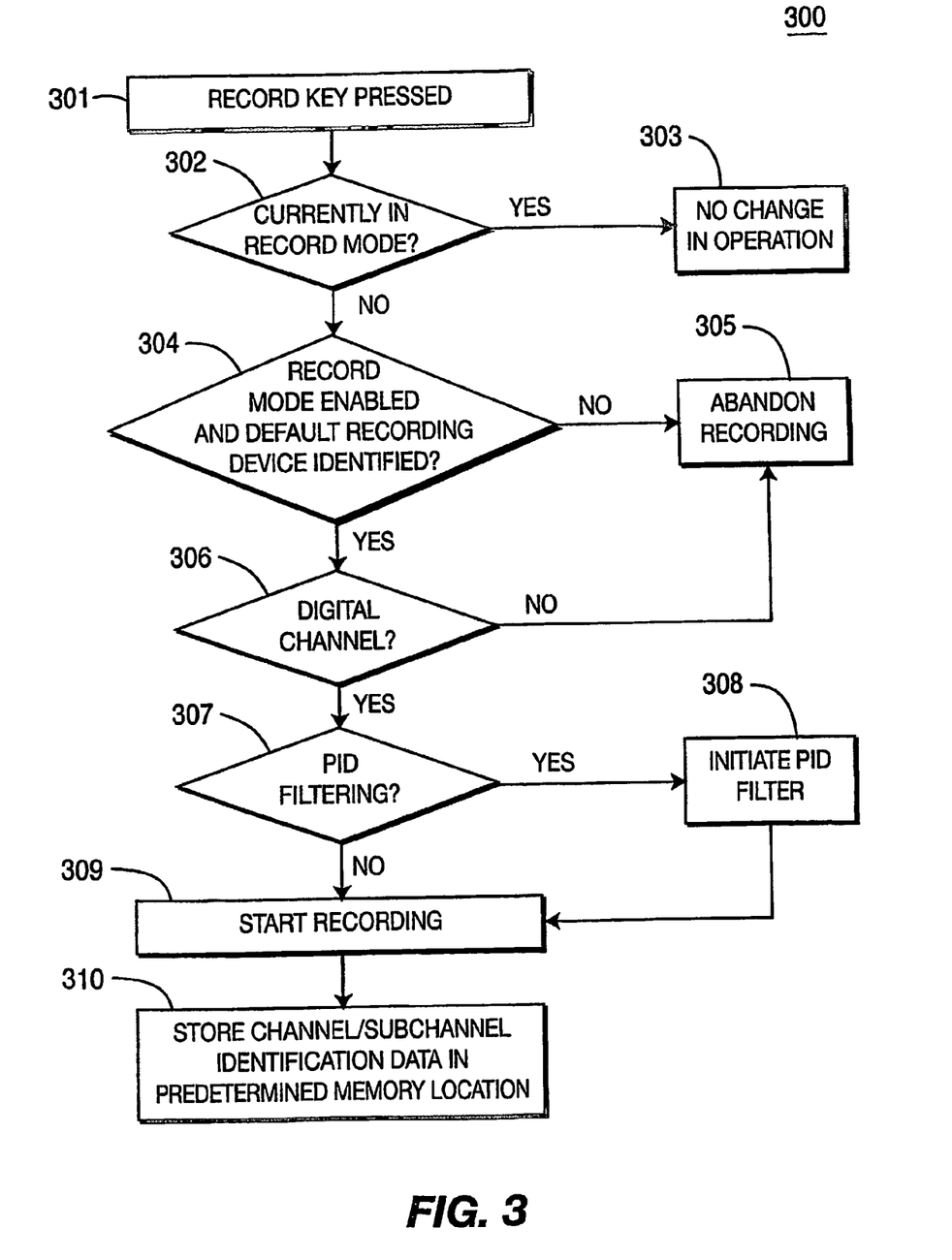
FIG. 3 is a flowchart illustrating exemplary steps according to one aspect of the present invention.
Figure 4:
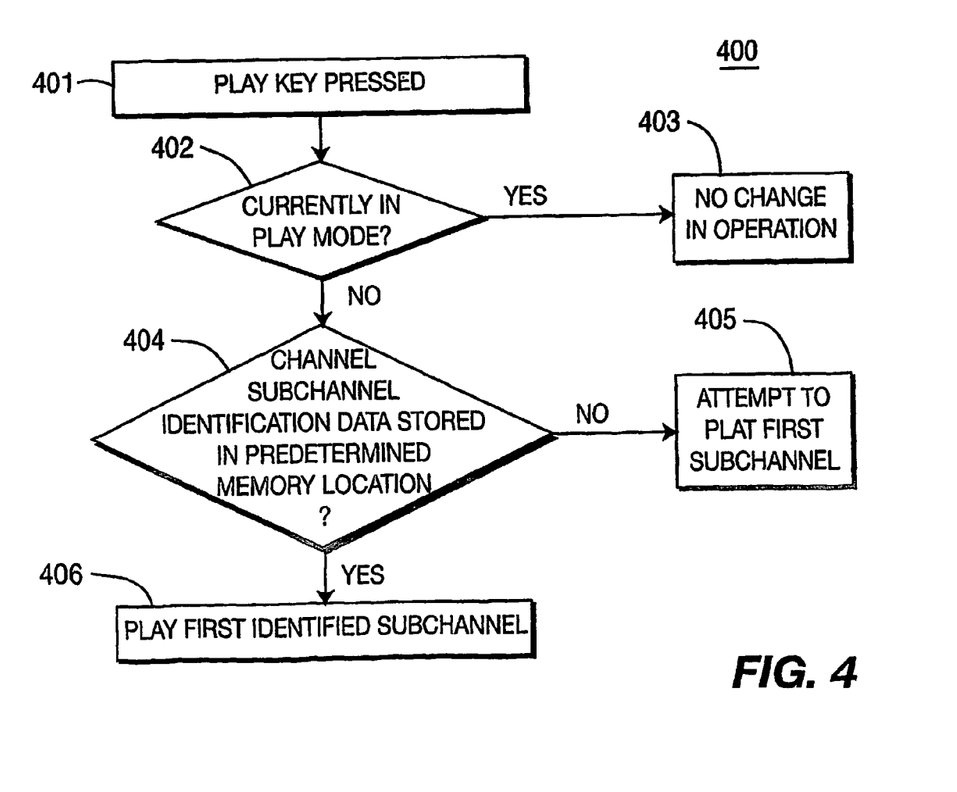
FIG. 4 is a flowchart illustrating exemplary steps according to another aspect of the present invention.

Referring to FIG. 3, a flowchart 300 illustrating exemplary steps according to one aspect of the present invention is shown. In particular, FIG. 4 illustrates how a recording operation may be performed according to an exemplary embodiment of the present invention. For purposes of example and explanation, the steps of FIG. 3 will be described with reference to the elements shown in environment 100 of FIG. 1. The steps of FIG. 3 are merely exemplary, and are not intended to limit the present invention in any manner.

At step 301, a record key of user input device 10 is pressed by a user to initiate a recording operation of one or more sub-channels of a channel. According to an exemplary embodiment, step 301 occurs while apparatus 20 is receiving signals such as audio, video and/or data signals represented as a particular channel from a signal source such as a terrestrial, cable, satellite, Internet and/or other signal source. Apparatus 20 is able to process these received signals using processor 14 to thereby generate a digital data stream representing a plurality of sub-channels included within the particular channel. Also according to this exemplary embodiment, apparatus 20 provides an on-screen menu which allows the user to select whether they want to record the entire digital data stream (i.e., all sub-channels of the channel), or only a portion of the digital data stream (i.e., one or more sub-channels of the channel). For example, a user may select to record only the particular sub-channel that he or she is currently watching. Accordingly, the user presses the record key of user input device 10 at step 301 to initiate a recording operation of one or more sub-channels included within the received channel.

At step 302, apparatus 20 determines whether it is currently in a record mode. During the record mode, apparatus 20 outputs data to a recording device such as digital recording device 40 for recording. According to an exemplary embodiment, processor 14 reads operating mode data stored in memory 15 to thereby determine whether apparatus 20 is currently in the record mode at step 302.

If the determination at step 302 is positive, process flow advances to step 303 where no change in operation occurs. Alternatively, if the determination at step 302 is negative, process flow advances to step 304 where apparatus 20 determines whether the record mode is enabled and a default recording device is identified. According to an exemplary embodiment, a setup process of apparatus 20 allows users to selectively enable or disable its record mode, and to select a default recording device (if the record mode is enabled). Accordingly, at step 304, processor 14 reads certain user setup data stored in memory 15 to thereby determine whether the record mode is enabled and a default recording device is identified.

If the determination at step 304 is negative, process flow advances to step 305 where apparatus 20 abandons the recording operation under the control of processor 14. Alternatively, if the determination at step 304 is positive, process flow advances to step 306 where apparatus 20 determines whether the current channel is a digital channel. According to an exemplary embodiment, processor 14 makes the determination at step 306 by detecting whether the signals currently being received by apparatus 20 are digital format signals such as Advanced Television Standards Committee (ATSC) type signals.

If the determination at step 306 is negative, process flow loops back to step 305 where apparatus 20 abandons the recording operation under the control of processor 14. Alternatively, if the determination at step 306 is positive, process flow advances to step 307 where apparatus 20 determines whether PID filtering is to be performed. According to an exemplary embodiment, processor 14 may use a PID filtering process for sub-channel blocking if the user has chosen at step 301 to record less than all of the sub-channels in the received channel. In such a case, processor 14 uses PIDs as the basis to block all sub-channels in the received channel, except for program guide data and the one or more sub-channels selected by the user for recording.

If the determination at step 307 is positive, process flow advances to step 308 where the PID filter of processor 14 is initiated in order to perform the PID filtering process during the recording operation pursuant to the user's sub-channel recording selection. From step 308, process flow advances to step 309 where apparatus 20 starts the recording operation by providing a record command signal and a PID-filtered digital data stream to digital recording device 40 via digital data bus 30 under the control of processor 14. According to an exemplary embodiment, processor 14 filters out all of the data packets in the received channel, except for those data packets having the desired PIDs corresponding to program guide data and the one or more sub-channels selected by the user for recording. The filtering of the data packets may be performed using methods known in the art. In this manner, only the data packets having the desired PIDs are provided to digital recording device 40 for recording. According to an exemplary embodiment, all secondary audio packets may also be filtered out to further reduce bandwidth requirements. Alternatively, applicable secondary audio packets and other packets, such as sub-picture packets may be passed to digital recording device 40 based on user selection if digital data bus 30 has sufficient bandwidth, and digital recording device 40 is able to handle the additional data. In this regard, apparatus 20 may select a bandwidth limit, and the user may be prompted to select digital data streams to be filtered out when the bandwidth limit is exceeded.

Alternatively, if the determination at step 307 is negative, process flow advances to step 309 where apparatus 20 starts the recording operation by providing the record command signal and the entire (i.e., unfiltered) digital data stream to digital recording device 40 via digital data bus 30 under the control of processor 14. The record command signal provided to digital recording device 40 at step 309 may for example be an AV/C protocol command signal, or a command signal of another protocol. The digital data stream provided to digital recording device 40 at step 309 includes program data (e.g., audio and/or video data) for one or more sub-channels, as well as program guide data.

At step 310, apparatus 20 may cause digital recording device 40 to store identification data for the channel and sub-channel(s) being recorded in a predetermined memory location. According to an exemplary embodiment, apparatus 20 obtains the channel and sub-channel identification data from the program guide data included in the digital data stream under the control of processor 14. For example, the channel and sub-channel identification data may be obtained from the program association table (PAT) data, program map table (PMT) data, and/or Program and Systems Information Protocol (PSIP) information included in the program guide data. Also according to an exemplary embodiment, the predetermined memory location used at step 310 includes a title field used to store titles or names of recordings, although other predetermined memory locations or fields may also be used. For example, if the digital recording device 40 is an AVHDD, the title field for each track is saved in the area of the table of contents.

Using the title field or the equivalent thereof (e.g., name block) for storing channel and sub-channel identification data may be desirable since it allows channel and sub-channel information to be displayed for the user as part of the title during playback. Conversely, the channel and sub-channel identification data may be stored at the end of the title (or other) field so that the channel and sub-channel information is cropped off when displaying the title for the user. According to another exemplary embodiment, if the title information already takes up the entire length of the title string, the last portion of the title field (e.g., the last 10 bytes, etc.) may be overwritten with channel and sub-channel identification data.

To enable the data storage at step 310, apparatus 20 provides a command signal and identification data for the channel and sub-channel(s) being recorded to digital recording device 40 via digital data bus 30 under the control of processor 14 which causes digital recording device 40 to store the channel and sub-channel identification data in the predetermined memory location. The command signal provided at step 310 may for example be an AV/C protocol command signal, or a command signal of another protocol. For example, with AV/C protocol, a WRITE INFO BLOCK command signal may be used by apparatus 20 at step 310 to thereby cause digital recording device 40 to store the channel and sub-channel identification data in the predetermined memory location, such as the name information block. According to an exemplary embodiment, the channel and sub-channel identification data have a predetermined format, such as "XXX-YYY" where "XXX" represents a three digit channel number and "YYY" represents a three digit sub-channel number. This type of format may for example be used for each sub-channel recorded. Other types of predetermined formats for the channel and sub-channel identification data may also be used.

Step 310 described above may be particularly helpful in enabling a playback operation according to the present invention. In particular, when using the aforementioned PID filtering process during a recording operation, a problem may occur if apparatus 20 is unable to edit certain program guide data such as the PAT and PMT data included in the digital data stream provided to digital recording device 40. Without editing such program guide data, the data recorded by digital recording device 40 will include program guide data for all sub-channels included in the particular digital data stream, even if the user has selected only a single sub-channel for recording. Accordingly, the user may be falsely led to believe that certain sub-channels have been recorded and may be played back. For example, the user may select a given sub-channel for playback and thereby cause the apparatus to look for sub-channel data that is referred to in the recorded program guide data (e.g., PAT, PMT), but is not present in the recorded digital data stream since it was previously filtered out by the PID filtering process. As a result, the user may be provided with a blank screen and no audio during playback thereby creating an undesirable viewing experience. As will be described later herein, storing identification data for the recorded channel and sub-channel(s) at step 310 helps avoid this problem.

Referring to FIG. 4, a flowchart 400 illustrating exemplary steps according to another aspect of the present invention is shown. In particular, FIG. 4 illustrates how a playback operation may be performed according to an exemplary embodiment of the present invention. For purposes of example and explanation, the steps of FIG. 4 will also be described with reference to the elements shown in environment 100 of FIG. 1. The steps of FIG. 4 are merely exemplary, and are not intended to limit the present invention in any manner.

At step 401, a play key of user input device 10 is pressed by a user to initiate a playback operation of a recorded sub-channel. At step 402, apparatus 20 determines whether it is currently in the play mode. During the play mode, apparatus 20 enables an output corresponding to recorded data provided from a recording device such as digital recording device 40. According to an exemplary embodiment, processor 14 reads the operating mode data stored in memory 15 to thereby determine whether apparatus 20 is in the play mode at step 402.

If the determination at step 402 is positive, process flow advances to step 403 where no change in operation occurs. Alternatively, if the determination at step 402 is negative, process flow advances to step 404 where apparatus 20 determines whether digital recording device 40 has stored channel and sub-channel identification data in the predetermined memory location. As previously described herein, apparatus 20 may cause digital recording device 40 to store channel and sub-channel identification data in the predetermined memory location, such as the title field or other location, during a recording operation at step 310 of FIG. 3.

According to an exemplary embodiment, apparatus 20 makes the determination at step 404 by providing a command signal to digital recording device 40 via digital data bus 30 under the control of processor 14 to thereby read data from the predetermined memory location. The command signal provided at step 404 may for example be an AV/C protocol command signal, or a command signal of another protocol. For example, with AV/C protocol, a READ INFO BLOCK command signal may be used by apparatus 20 at step 404 to thereby read any data from the predetermined memory location, such as the name information block. As previously indicated herein, the channel and sub-channel identification data may be stored in the predetermined memory location according to a predetermined format (e.g., "XXX-YYY" where "XXX" represents a three digit channel number and "YYY" represents a three digit sub-channel number). Accordingly, apparatus 20 can readily detect whether digital recording device 40 has stored channel and sub-channel identification data in a predetermined memory location based on the format of any read data.

If the determination at step 404 is negative, process flow advances to step 405 where apparatus 20 attempts to play the first sub-channel. According to an exemplary embodiment, apparatus 20 attempts to initiate the playback operation at step 405 by providing a play command signal to digital recording device 40 via digital data bus 30 under the control of processor 14. The play command signal may for example be an AV/C protocol command signal, or a command signal of another protocol. The play command signal provided at step 405 causes digital recording device 40 to provide stored digital data including program data (e.g., audio and/or video data) for the recorded sub-channel(s) and program guide data to apparatus 20. Apparatus 20 processes the received digital data under the control of processor 14 and thereby attempts to enable an aural and/or visual output corresponding to the first sub-channel. In particular, processor 14 attempts to tune the first sub-channel based on information (e.g., PAT, PMT, etc.) in the received program guide data. However, if the first sub-channel was not selected for recording by the user at step 301, the first sub-channel was not recorded and therefore does not exist in the digital data provided from digital recording device 40. In such a case, the first sub-channel cannot be played back and the user will be provided with a blank display and no audio at step 405.

Alternatively, if the determination at step 404 is positive, process flow advances to step 406 where apparatus 20 plays the first identified sub-channel. According to an exemplary embodiment, apparatus 20 initiates the playback operation at step 406 by providing a play command signal to digital recording device 40 via digital data bus 30 under the control of processor 14. The play command signal may for example be an AV/C protocol command signal, or a command signal of another protocol. The play command signal provided at step 406 causes digital recording device 40 to provide stored digital data including program data (e.g., audio and/or video data) for the recorded sub-channel(s) and program guide data to apparatus 20. Apparatus 20 uses the channel and sub-channel identification data read at step 404 to process the received digital data under the control of processor 14 and thereby enables an aural and/or visual output corresponding to the first identified sub-channel. In particular, processor 14 uses the channel and sub-channel identification data read at step 404 to tune the first identified sub-channel and enable a corresponding aural and/or visual output. According to an exemplary embodiment, apparatus 20 plays the first identified sub-channel at step 406 since its identification data is read first from the predetermined memory location at step 404. For example, if a recorded channel includes two recorded sub-channels, apparatus 20 plays the first one of these sub-channels at step 406 since the identification data for the first sub-channel is read (and thereby identified) before the identification data for the second sub-channel at step 404. By using the channel and sub-channel identification data to enable the playback operation at step 406, the present invention advantageously avoids the potential problem of step 405 where playback of an unrecorded sub-channel is attempted. Accordingly, the user will not encounter a blank display and no audio during the playback operation of step 406.

As described herein, the present invention provides a method and apparatus for controlling a digital recording device via a digital data bus to enable sub-channel recording and playback. The present invention may be applicable to various apparatuses, either with or without a display device. Accordingly, the phrase "television signal receiver" as used herein may refer to systems or apparatuses including, but not limited to, television sets, computers or monitors that include a display device, and systems or apparatuses such as set-top boxes, VCRs, digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for enabling digital recording, comprising:
   receiving signals representing a channel comprising a plurality of sub-channels;
   enabling display of an on-screen menu which allows a user to select from a plurality of different sub-channel recording options, including a first sub-channel recording option to record all of said plurality of sub-channels, and a second sub-channel recording option to record one or more but less than all of said plurality of sub-channels;
   filtering digital data including secondary audio packets from said channel, but passing program guide data from said channel, in response to user selection of said second sub-channel recording option to thereby produce filtered digital data representing at least one but less than all of said plurality of sub-channels;
   providing said filtered digital data to a digital recording device via a digital data bus;
   detecting that a bandwidth limit associated with said digital data bus is exceeded; and
   prompting said user to select specific digital data from said channel to be filtered out in response to said detection.

2. The method of claim 1, wherein said digital data bus includes an IEEE-1394 bus.

3. The method of claim 1, wherein said digital recording device includes an audio/video hard disk drive (AVHDD).

4. The method of claim 1, further comprising:
   causing said digital recording device to store identification data corresponding to said user selection in a memory of said digital recording device, said identification data including a channel number and at least one sub-channel number;
   reading said identification data from said memory of said digital recording device responsive to a user input initiating a playback operation; and
   enabling display of said identification data during said playback operation.

5. The method of claim 4, wherein said digital data includes program data comprising audio and video data.

6. The method of claim 5, further comprising the steps of:
   receiving said program data from said digital recording device via said digital data bus during said playback operation; and
   enabling an output corresponding to one of said plurality of sub-channels during said playback operation.

7. The method of claim 1, further comprising a step of enabling an output corresponding to one of said plurality of sub-channels while said digital recording device records said digital data.

8. An apparatus, comprising:
   means for receiving signals representing a channel comprising a plurality of sub-channels;
   means for enabling display of an on-screen menu which allows a user to select from a plurality of different sub-channel recording options, including a first sub-channel recording option to record all of said plurality of sub-channels, and a second sub-channel recording option to record one or more but less than all of said plurality of sub-channels;
   said enabling means filtering digital data including secondary audio packets from said channel, but passing program guide data from said channel, in response to user selection of said second sub-channel recording option to thereby produce filtered digital data representing at least one but less than all of said plurality of sub-channels;
   said enabling means enabling output of said filtered digital data to a digital recording device via a digital data bus; and
   said enabling means prompting said user to select specific digital data from said channel to be filtered out in response to determining that a bandwidth limit associated with said digital data bus is exceeded.

9. The apparatus of claim 8, wherein said digital data bus includes an IEEE-1394 bus.

10. The apparatus of claim 8, wherein said digital recording device includes an audio/video hard disk drive (AVHDD).

11. The apparatus of claim 8, wherein:
    said enabling means causes said digital recording device to store identification data corresponding to said user selection in a memory of said digital recording device;
    said identification data includes a channel number and at least one sub-channel number;
    said enabling means reads said identification data from said memory of said digital recording device responsive to a user input initiating a playback operation; and
    said enabling means enables display of said identification data during said playback operation.

12. The apparatus of claim 11, wherein said digital data includes program data comprising audio and video data.

13. The apparatus of claim 11, wherein said enabling means enables an output corresponding to one of said plurality of sub-channels responsive to said user input initiating said playback operation.

14. The apparatus of claim 8, wherein said enabling means enables an output corresponding to one of said plurality of sub-channels while said digital recording device records said digital data.

15. A television signal receiver, comprising:
    an input operative to receive signals representing a channel comprising a plurality of sub-channels;
    a processor operative to enable display of an on-screen menu which allows a user to select from a plurality of different sub-channel recording options, including a first sub-channel recording option to record all of said plurality of sub-channels, and a second sub-channel recording option to record one or more but less than all of said plurality of sub-channels;

said processor filtering digital data including secondary audio packets from said channel, but passing program guide data from said channel, in response to user selection of said second sub-channel recording option to thereby produce filtered digital data representing at least one but less than all of said plurality of sub-channels;

said processor enabling output of said filtered digital data to a digital recording device via a digital data bus; and said processor prompting said user to select specific digital data from said channel to be filtered out in response to determining that a bandwidth limit associated with said digital data bus is exceeded.

16. The television signal receiver of claim 15, wherein said digital data bus includes an IEEE-1394 bus.

17. The television signal receiver of claim 15, wherein said digital recording device includes an audio/video hard disk drive (AVHDD).

18. The television signal receiver of claim 15, wherein:
said processor causes said digital recording device to store identification data corresponding to said user selection in a memory of said digital recording device;
said identification data includes a channel number and at least one sub-channel number;
said processor reads said identification data from said memory of said digital recording device responsive to a user input initiating a playback operation; and
said processor enables display of said identification data during said playback operation.

19. The television signal receiver of claim 18, wherein said digital data includes program data comprising audio and video data.

20. The television signal receiver of claim 18, wherein said processor enables an output corresponding to one of said plurality of sub-channels responsive to said user input initiating said playback operation.

21. The television signal receiver of claim 15, wherein said processor enables an output corresponding to one of said plurality of sub-channels while said digital recording device records said digital data.

* * * * *